United States Patent [19]
Yoshikawa

[11] Patent Number: 5,464,074
[45] Date of Patent: Nov. 7, 1995

[54] DIFFERENTIAL SPRING-BACK ACTION BETWEEN BICYCLE BRAKE ARMS ALONG WITH SPRING-BACK STOPPER STRUCTURE

[75] Inventor: Kunihiko Yoshikawa, Saitama, Japan

[73] Assignee: Yoshikawa Mfg. Co., Ltd., Saitama, Japan

[21] Appl. No.: 174,315

[22] Filed: Dec. 30, 1993

Related U.S. Application Data

[62] Division of Ser. No. 16,187, Feb. 11, 1993, Pat. No. 5,328,001, which is a continuation of Ser. No. 808,764, Dec. 17, 1991, abandoned.

[30] Foreign Application Priority Data

Jul. 4, 1991 [JP] Japan ................................. 3-190529
Jul. 15, 1991 [JP] Japan ................................. 3-200108

[51] Int. Cl.$^6$ ............................................. B62L 3/02
[52] U.S. Cl. ................................. 188/24.22; 188/216
[58] Field of Search .................... 188/24.12, 24.14, 188/24.15, 24.19, 24.22, 24.21, 2 D, 166, 216, 217, 24.11

[56] References Cited

U.S. PATENT DOCUMENTS

| | | | |
|---|---|---|---|
| 4,263,990 | 4/1981 | Yoshigai | 188/24.19 |
| 4,301,894 | 11/1981 | Arai | 188/216 X |
| 4,482,033 | 11/1984 | Yoshigai | 188/196 M X |
| 4,766,979 | 8/1988 | Nagano | 188/24.12 |
| 4,838,387 | 6/1989 | Yoshigai | 188/24.22 X |
| 5,188,200 | 2/1993 | Modolo | 188/24.19 X |

FOREIGN PATENT DOCUMENTS 0189194 7/1986 European Pat. Off. ............ 188/24.12

Primary Examiner—Josie A. Ballato
Attorney, Agent, or Firm—Cushman Darby & Cushman

[57] ABSTRACT

A braking device for a two-wheeler, such as bicycle which comprises a pair of left and right arms pivotally attached to a frame of the two-wheeler, each having on its distal end portion a brake shoe, and a spring for energizing the arms to move toward brake releasing direction. This braking device is characterized in that one of the arms is more strongly energized by the spring than the other arm is, and that a stopper is provided to restrict the extent of the movement of the strongly energized arm toward the brake releasing direction, so that, when arms are being set back to the unactuated original state, this strongly energized arm is stopped of its movement by the stopper before the other arm finally returns to its original state.

6 Claims, 16 Drawing Sheets

FIG. 3
(a)
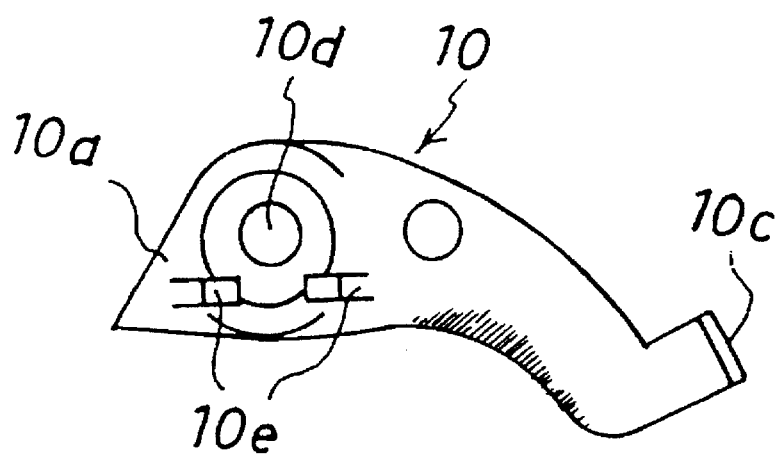
(b)
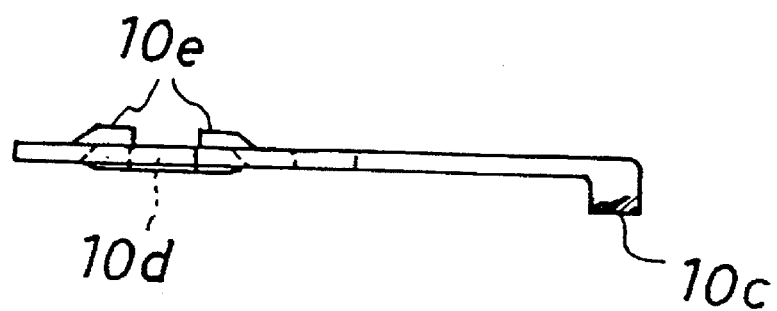

DIFFERENTIAL SPRING-BACK ACTION BETWEEN BICYCLE BRAKE ARMS ALONG WITH SPRING-BACK STOPPER STRUCTURE

This is a division of application Ser. No. 0 8/016,187, filed Feb.-11, 1993, now U.S. Pat. No. 5,328,001, which is a cont. of 07/808,764, filed Dec. 17, 1991 and now abandoned.

BACKGROUND OF THE INVENTION (a) Field of the Invention

The present invention relates to a method and a device for applying and releasing the brakes of a two-wheeler which enable a pair of the right and left shoes to set back reliably from the rim of a wheel when the brakes are released.

(b) Description of the Prior Art

There are known, as the brakes for a two-wheeler such as a bicycle, a side-pull type brake, a center-pull type brake and a cantilever type brake. In any of these types, the brake comprises a pair of arms which is pivotally mounted on the attaching bolt, a pair of shoes mounted on the distal end portion of each of the arms, a brake lever, and a brake wire whose one end is connected to one of the arms and the other end connected to the brake lever. The pair of arms is normally energized to take an unactuated position. The application or release of the brakes are effected via the operation of the brake lever to rotate (or swing) via the brake wire the pair of arms around the attaching bolt thereby to cause the displacement of the pair of brake shoes, i.e. moving the shoes toward the RIM of a wheel to pressingly hold both sides of the rim between the pair of the shoes thereby applying the braking of the two-wheeler, or moving the shoes to set back from both sides of the rim of the wheel thereby releasing the braking of the two-wheeler. It is preferable in order to achieve an effective braking to make the distance between the forward surface of each of the brake shoes and each side of the rim facing to each of the brake shoes as equal as possible before actuating the braking operation.

Accordingly, the braking device is conventionally installed to a bicycle, in such a process that an attaching bolt for pivotally mounting the brake arms is first fixed to a frame of the bicycle such that each of the brake shoes is kept apart at a prescribed distance from the rim, and then the brake wire is fastened to the brake arm.

However, in the case of the center-pull type brake or the cantilever type brake, each of the arms is separately secured to the frame of the bicycle, and then connected to a brake wire, so that it is rather difficult to set both of the right and left brake shoes in equidistance to the side surfaces of the rim.

In contrast, in the case of the side-pull type brake, it is rather easy to uniformly set the left and right arms. Actually, however, it is often unavoidable to cause a nonuniformity between the distance from the tip surface of left brake shoe to one side of the rim, and the distance from the tip surface of right brake shoe to the other side of the rim. In order to correct this nonuniformity, it has been conventionally conducted to readjust the distances from the tip surfaces of right and left brake shoes to the sides of the rim by forcefully deforming part of a spring attached to the arms thereby adjusting the restoring or repulsing force of the spring.

However, since the repulsing force of the spring is acted separately on each of the arms, any difference in repulsing force of the spring that will be applied to the left and right arms will invite a situation at the time of effecting the braking that the brake shoe which is mounted on an arm energized weakly by the spring first moves later to the rim, and then the brake shoe which is mounted on an arm strongly energized by the spring moves to the rim. In this manner, the pair of the shoes are successively contacted to the rim thereby holding the rim from both sides.

At the time of releasing the braking on the contrary, the brake shoe which is mounted on an arm strongly energized by the spring is first set back from the rim, and then the brake shoe which is mounted on an arm weakly energized by the spring is set back later from the rim.

Accordingly, if the restoring of one of the arms is fairly weak, the brake shoe which is mounted on this arm is hardly set back from the rim, but remains as being contacted to the rim, thereby causing the generations of frictional noise, increasing the load on the wheel or giving rise to other troubles during ordinary running of the wheeler.

SUMMARY OF THE INVENTION

This invention has been made in view of the above circumstances, and a first object of this invention is to provide a method and a device for applying and releasing the brakes of a two-wheeler, wherein either one of the right and left arms is so set as to have a stronger restoring force than the other one of the arms, so that a time lag is intentionally caused to occur between the pivotal movements of these arms at the time of releasing the braking, and a means is provided to intercept the pivotal movement of the arm which is first set back from the rim, thereby all of the restoring force derived from the spring is then directed to the restoring movement of the other arm which is subsequently set back from the rim. A second object of this invention is to provide a stopper which can be applicable to the conventional braking apparatus.

In order to attain the above objects, this invention provides as a first feature a mechanism of a brake for a two-wheeler comprising a pair of left and right arms pivotally attached to a frame of the two wheeler, each having on its distal end portion a brake shoe, and a spring for energizing the arms to move toward brake releasing direction, which is characterized in that:

(A-1) one of the arms is more strongly energized by the spring than the other arm, and a stopper is provided to restrict the extent of the movement of said one of the arms toward the brake releasing direction;

(A-2) at the time of releasing the brake, said one of the arm which is more strongly energized is set back prior to the setting back movement of said the other arm from the rim;

(A-3) when said one of the arm which is more strongly energized is set back to a prescribed extent toward the brake releasing direction, the pivotal movement of said one of the arms is restricted by said stopper; and (A-4) then, said other arm is allowed to set back to the original position.

This invention further provide as a second feature, a braking device for a two-wheeler, comprising a pair of left and right arms pivotally attached to a frame of the two wheeler, each having on its distal end portion a brake shoe, and a spring for energizing the arms to move toward a brake releasing direction, which is characterized in that:

(B-1) one of the arms is more strongly energized by the spring than the other arm is; and (B-2) a stopper is provided to restrict the extent of the movement of said one of the arms toward the brake releasing direction, so that, when said one of the arms is set back to the unactuated original state, said one of the arms is stopped of its movement before the setting-back movement of said other arm is completed.

This invention further provide as a third feature, a braking device for a two-wheeler, wherein said spring comprises;

a main spring disposed in a constricted state against its restoring force between an extended end portion of one of the arms, which is connected to an outer wire of the brake wire, and an extended end portion of the other one of the arms, which is connected to an inner wire of the brake wire; and a supplementary spring attached to one of the arms for energizing at the time of braking said one of the arms to restore its original state;

said stopper being attached to the center bolt in such a manner that said one of the arms attached with said supplementary spring is restricted of its movement to depart from the rim as said one of the arms has been set back to a prescribed distance at the time of braking.

In the first feature of the invention, when the brake wire is pulled thereby to apply a braking, the arms are actuated to pivotally move thereby to force the brake shoes mounted on the arms to approach to the rim while causing the spring to be constricted.

In this case, the spring is set so as to more strongly energize one of the arms to move in a direction opposite to the rim than the other arm is.

Accordingly, when a brake is applied, the arm which is comparatively weakly energized is first pivotally rotated thereby causing the brake shoe mounted thereon to approach to the rim, while constricting the spring.

Then, the arm which is comparatively strongly energized is pivotally rotated thereby causing the brake shoe mounted thereon to approach to the rim, while constricting the spring. In this manner, these brake shoes are caused to sequentially contact to the rim with a time lag occurring therebetween thereby frictionally holding the rim between these brake shoes, and effecting the braking of the wheel.

At the time of releasing the braking, the arm which is comparatively strongly energized is first set back from the rim, and after being rotated to some extent is intercepted of its backward movement by the stopper.

At this moment, the restoring force which has been applied so far to the strongly energized arm is then applied to the weakly energized arm, thereby increasing the restoring force to be applied to the weakly energized arm, thus assuring the detachment from the rim of this arm.

In the second feature of the invention, the stopper is fixed to the frame of the two wheeler through its mounting member, thus allowing the arm to be intercepted of its movement toward the brake-releasing direction.

A contacting portion is provided to the arm in such a manner that, at the time of releasing the brake, the arm can be intercepted during its pivotal movement to set back to its original position.

Since the pivotal movement of the arm can be intercepted by the contact of the contacting portion of the arm with the stopper during the brake-releasing movement of the arm, it is possible to achieve the above objects even with the conventional brake apparatus by altering the restoring strength of the spring, and mounting the stopper to the frame of a two wheeler.

This invention will be further explained with reference to the accompanying drawings.

BRIEF DESCRIPTION OF THE DRAWINGS

FIG. 3 (a) is a front view of a stopper. (b) is a plan view of a stopper.

DESCRIPTION OF PREFERRED EMBODIMENTS

Figure 1:
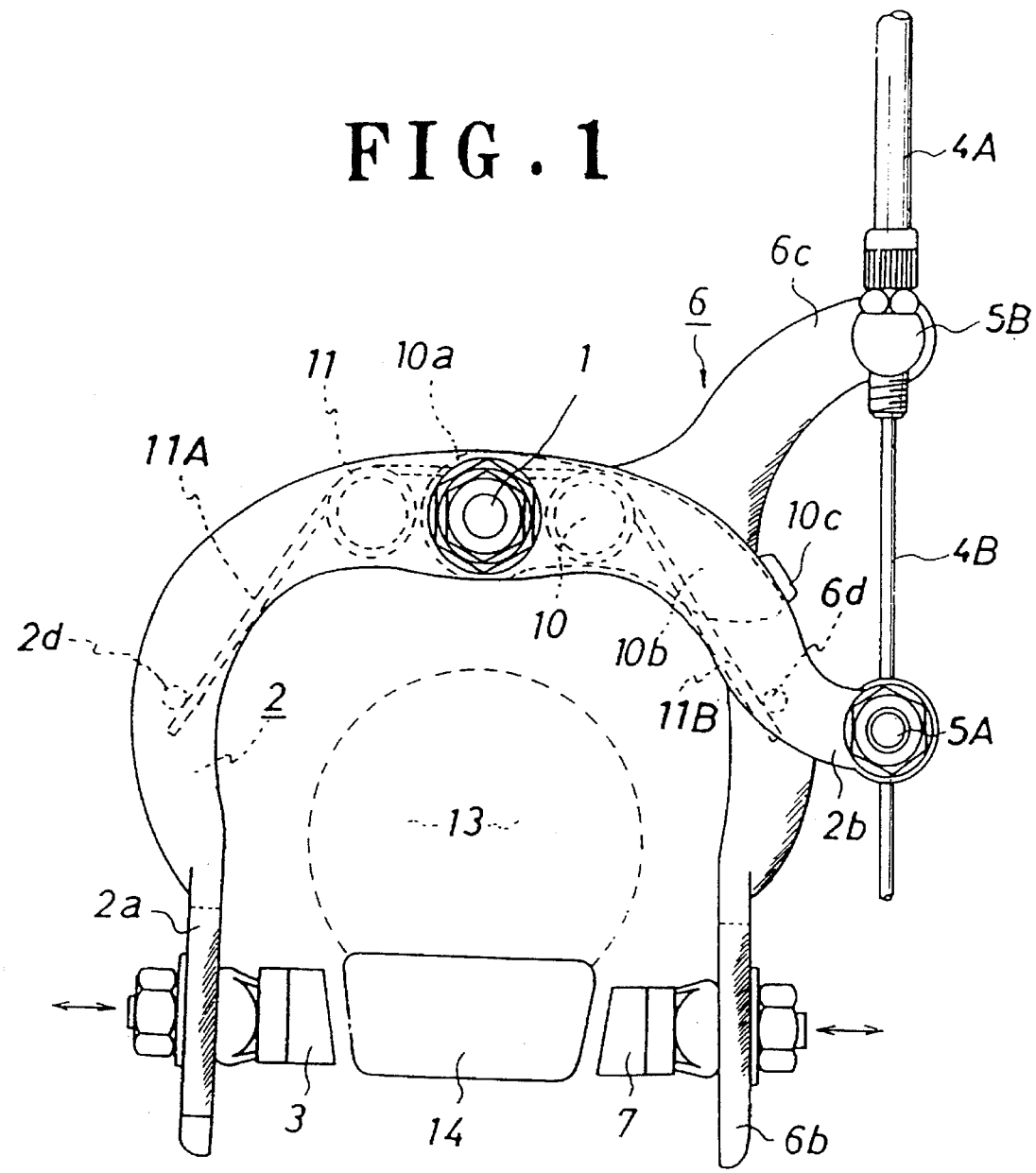
FIG. 1 is a front view of the braking apparatus which is applied to a side-pull type brake.

The brake mechanism of this invention will be further explained with reference to the preferred examples shown in the drawings.

Figure 2:
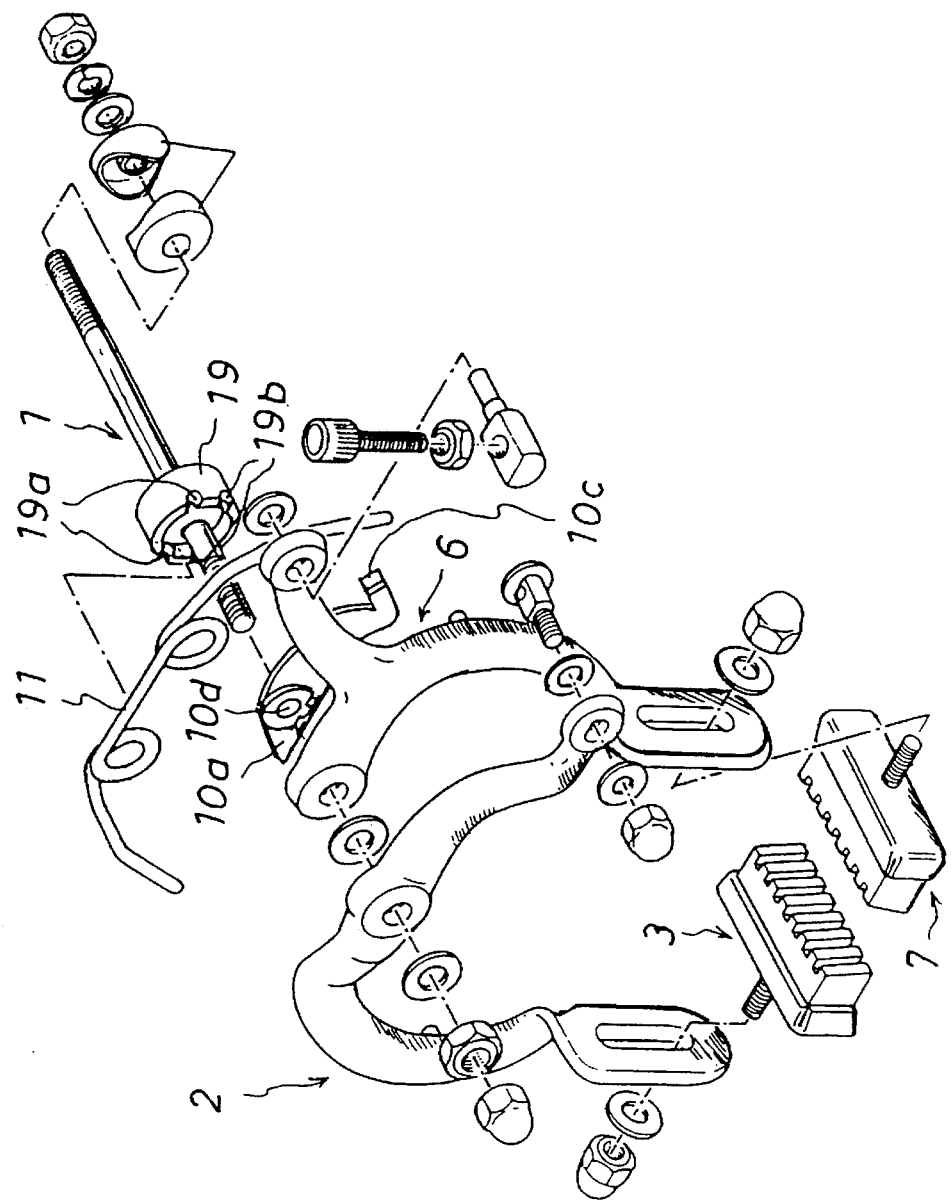
FIG. 2 is a perspective view showing the composition of a brake device in FIG. 1.

FIGS. 1 and 2 represents an preferred embodiment of a side-pull type brake of this invention.

This side-pull type brake comprises an central bolt (or an attaching bolt) 1, a pair of left and right arms, i.e. C-shaped arm 2, and Y-shaped arm 6, a spring 11 for imposing a restoring (or repulsing) force on both of the arms 2 and 6, and a stopper 10 for intercepting the swinging movement of one of the arms 2 and 6 at a prescribed position.

The C-shaped arm 2 is in the form of approximately C in plan view, and the central portion of which is pivotally supported on the central bolt 1. A brake shoe 3 is mounted on one end portion 2a of the C-shaped arm 2, and a wire-fastening means 5 for connecting the arm 2 to an inner wire 4 extending within an outer wire 8 is provided on the other end portion 2b of the C-shaped arm 2.

The Y-shaped arm 6 is in the form of approximately y in plan view, and the proximal end portion 6a of which is disposed inside the C-shaped arm 2 and pivotally supported on the central bolt 1.

A brake shoe 7 is mounted on the lower extended end portion 6b of the Y-shaped arm 6, and a wire-fastening means 9 for connecting the arm 6 to the distal end portion of the outer wire 8 is provided on the other end portion of the upper extended end portion 6c of the Y-shaped arm 6.

The spring 11 employed herein is of a linear spring (or a spectacle spring) which has been obtained by modifying the conventional spectacle spring. The linear central portion of the spring 11 is secured by a mounting member 19A which is fixed to the central bolt 1. Wound portions are formed at each of the left and right sides. Both linear end portions of the spring 11, forming actuating arms 11A and 11B, are inclined downward, outwardly extending to be engaged with the insides of pins 2d and 6d projecting from the arms 2 and 6.

The spring 11 is mounted in a fairly inclined state such that the restoring force of one of the actuating arms 11A and 11B becomes stronger than that of the other actuating arm, for example the restoring force of the arm 11B is set stronger than that of the other actuating arm 11A.

In this embodiment, since the arm 11B which is more strongly energized is engaged with the pin 6d of the Y-shaped arm 6, when the inner wire 4 is pulled in the braking operation of the brake lever (not shown), the extended end portion 6c of the Y-shaped arm 6 and the other end portion 2b of the C-shaped arm 2 is caused to approach toward each other thereby constricting the coil spring 11 and increasing the repulsing power of the coil spring 11, so that both of the extended end portion 6c of the Y-shaped arm 6 and the other end portion 2b of the C-shaped arm 2 are energized to set back from each other (the brake releasing direction).

Figure 4:
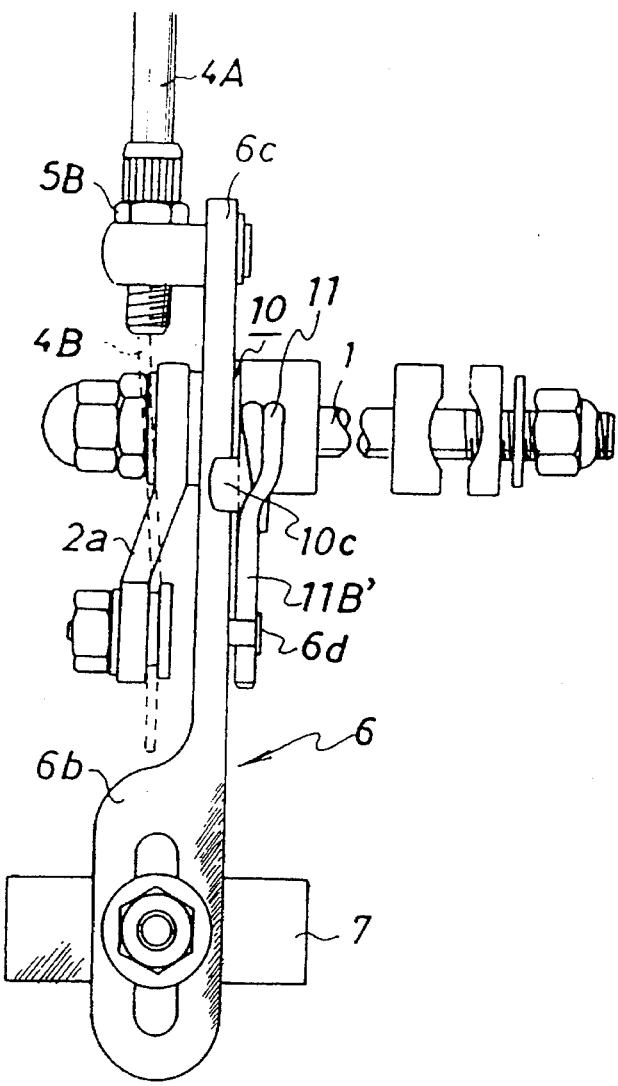
FIG. 4 is a side view of the braking apparatus shown in FIG. 1.
Figure 5:
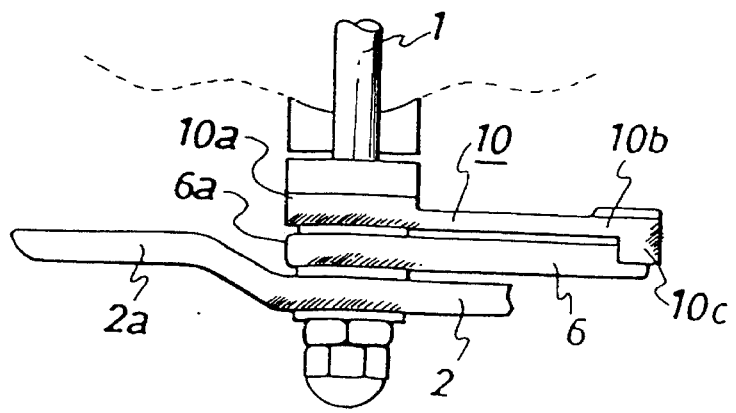
FIG. 5 is a plan view of the braking apparatus shown in FIG. 1.

On the other hand, the stopper 10 is fixed through its proximal end 10a to the central bolt 1, and disposed inside the Y-arm 6 as shown in FIG. 4 and FIG. 5.

In this embodiment, the proximal end portion of the stopper 10 is secured to a mounting member which is fixed to the central bolt 1 so as to set the stopper 10 in a predetermined position.

Said stopper 10 comprises a hole 10d for inserting a bolt on the side of the proximal end 10a and a pair of projecting portions 10e whereunder, as shown in FIGS. 2 and 3 (a), (b).

A periphery of the hole 10d projects forward (on the side of the arm attached) in a shape of a disc in order to function as a washer.

And this stopper 10 is hooked to a spring support member 19 for hooking the main spring 11 which is fixed on the bolt 1 as shown in FIG. 2. This spring support member 19 comprises a ring shape wall projecting forward and a pair of grooves formed horizontally on upper portion 19a for hooking the spring 11 and on lower portion 19b for hooking said projecting portions 10e of the stopper 10. Said spring support member 19 can be also worked to be rotated 180° as disclosed in Japanese utility model registered No. 1,741,403 and in Japanese patent publication No. Hei 03-29492.

Thus, the stopper 10 is fixed to be held with the arms 2, 6 and the spring support member 19.

The distal end portion 10b of the stopper 10 extends along the inner surface of the extended end portion 6b of the Y-shaped arm 6, and is provided at its edge portion with a projection 10c, which is adapted to restrict the extent of rotational opening movement of the Y-shaped arm 6 by causing the upper edge portion of the extended end portion 6c to strike on the projection 10c.

The side-pull type brake as constructed above can be mounted on a two-wheeler as explained below.

First, both of the C-shaped arm 2 and Y-shaped arm 6 are attached to the central bolt 1 in such a way that they are free to rotate around the central bolt 1. Specifically, the Y-shaped arm 6 is rotatably secured to the central bolt 1 in such a manner that the upper surface of the brake shoe 7 mounted on the extended end portion 6b of the Y-shaped arm 6 is set apart at a distance of, for example, about 2 mm from the side surface of the rim 14 of the wheel 13, thus fixing the Y-shaped arm to the frame of the two-wheeler.

To this central bolt 1 is fixed a spring holder 1A which holds the central portion of the spring 11. The stopper 10 is fasted or integrally fixed to the spring holder 1A mounted on the central bolt 1 via the spring holder 1A.

Then, the upper surface of the brake shoe 3 mounted on one end portion 2a of the C-shaped arm 2 is also set apart at a distance of, for example, about 2 mm from the side surface of the rim 14 of the wheel 13, and the tip portion of the inner wire 4 is fastened by the wire-fastening means 5. Then, the Y-shaped arm 6 and C-shaped arm 2 are uniformly positioned to the rim 14 of the wheel 13.

When the brake is applied, since the repulsing force of the actuating arm 11B positioned at the Y-shaped arm 6A is larger than that of the actuating arm 11A positioned at the C-shaped arm 2, the C-shaped arm 2 or the brake shoe 3 mounted on the C-shaped arm 2 is first swung to approach the rim 14.

Then, the Y-shaped arm 6 or the brake shoe 7 mounted on the Y-shaped arm 6 is swung later to approach the rim 14.

As a result, both of the brake shoes 3 and 7 are successively contacted to the rim 14 thus pressing the wheel 13 to stop the rotation of the wheel 13.

When the brake is released, since the repulsing force of the actuating arm 11B positioned at the Y-shaped arm 6 is energized larger than that of the actuating arm 11A positioned at the C-shaped arm 2, the extended end portion 6b of the Y-shaped arm 6 or the brake shoe 7 is first set back from the rim 14 of the wheel 13, and then the outer edge portion of the extended end portion 6b is struck onto projection 10c of the stopper 10 thereby stopping the rotation of the Y-shaped arm 6.

As a result, the repulsing force acting so far on the Y-shaped arm 6 is then acted on the C-shaped arm 2 together with the repulsing force which has been originally acted on the C-shaped arm 2, thereby ensuring the detachment of the brake shoe 3 mounted on the end portion 2a of the C-shaped arm 2 from the rim 14 of the wheel 13 and causing the C-shaped arm 2 to return to the original position.

Figure 6:
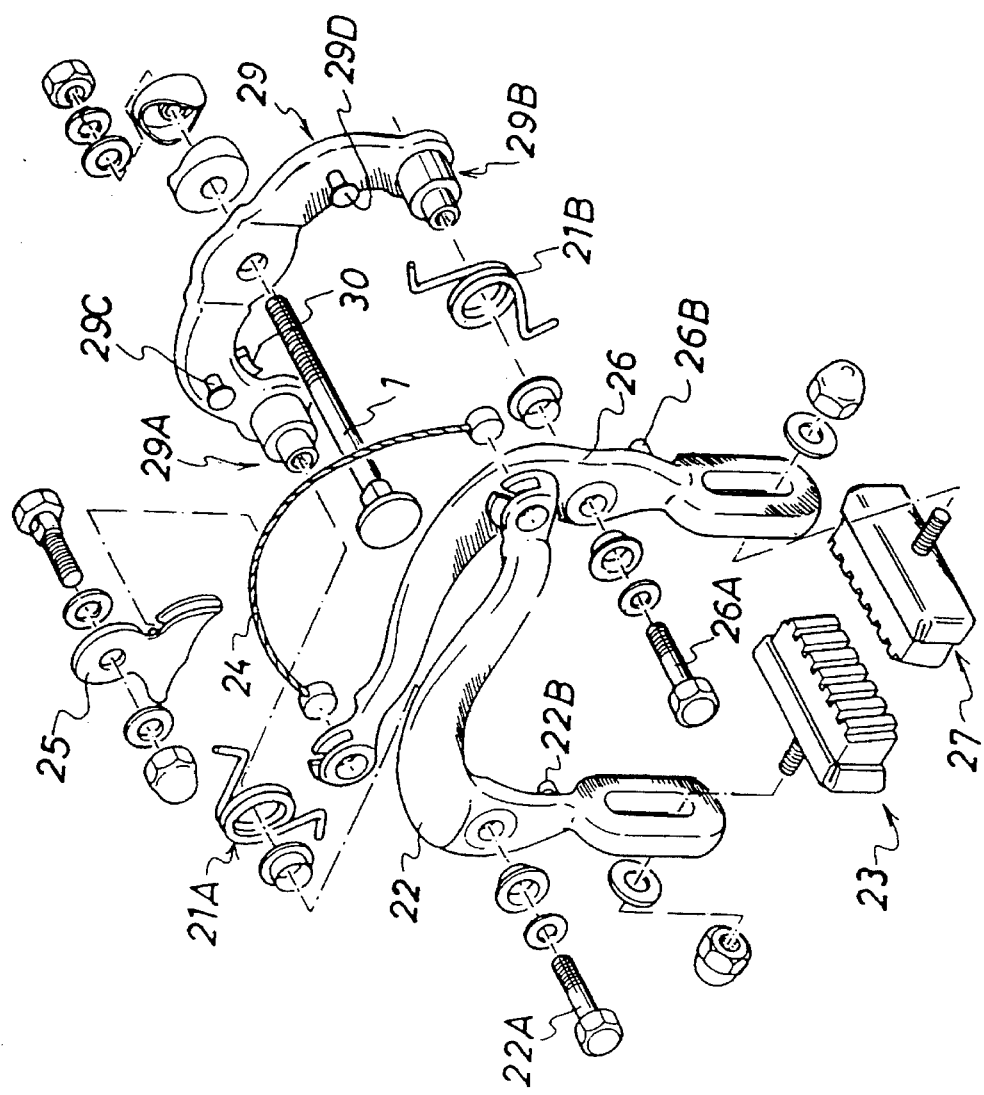
FIG. 6 is a perspective view of the braking apparatus which is applied to a center-pull type brake.
Figure 7:
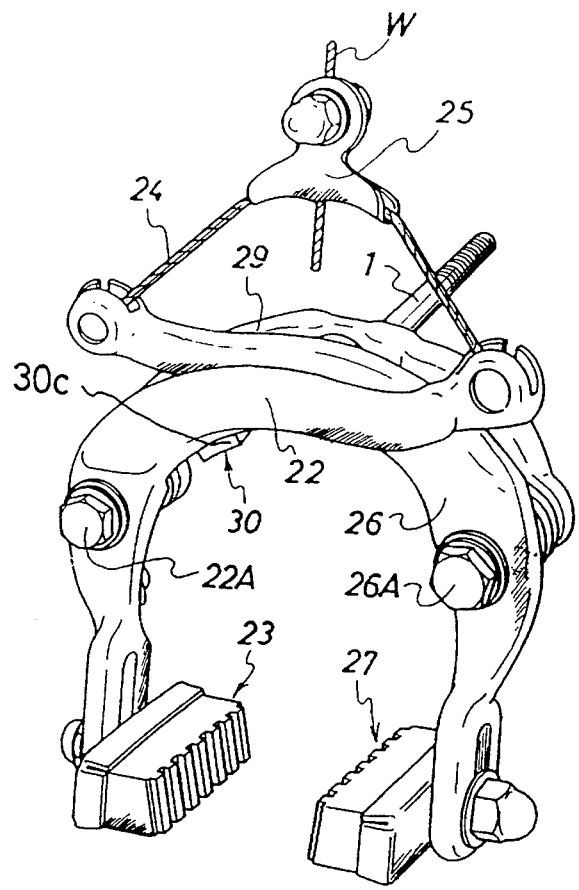
FIG. 7 is a front side view of the braking apparatus shown in FIG. 6.
Figure 8:
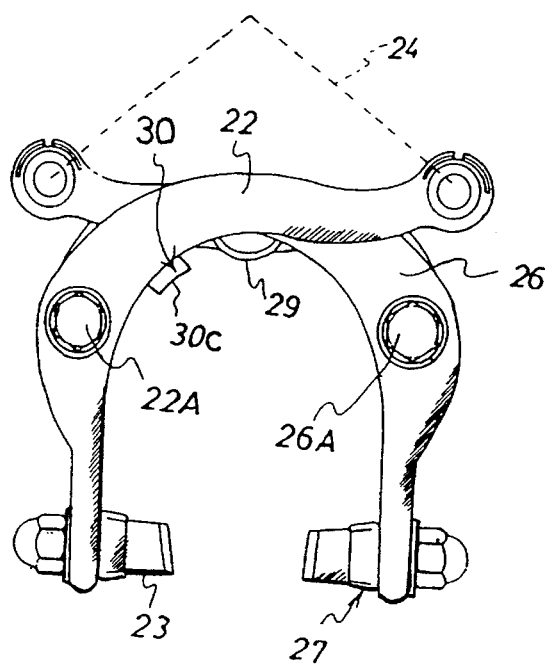
FIG. 8 is a front view of the braking apparatus shown in FIG. 6.

The brake apparatus shown in FIGS. 6 to 8 is an example of a center-pull type brake according to another embodiment of this invention. This center-pull type brake comprises an arch-like plate 29 fixed by means of a central bolt 1 to the frame of a two-wheeler, and a pair of arms 22 and 26, each having a shape of approximately C. These arms 22 and 26 are symmetrically superposed and disposed in front of the arch-like plate 29. The intermediate portion of each of the arms 22 and 26 is fixed to the boss 29A and 29B provided at each end portion of the arch-like plate 29 by means of arm-fixing bolts 22A and 26A. The upper extended end portion of each of the arms 22 and 26 is connected with a fitting member attached to the end portion of the pulling wire 24, the central portion of which is fastened to a triangular metal fitting 25. The metal fitting 25 is adapted to be pulled by a brake wire W connected to an operating lever.

In this case, the springs 21A and 21B are respectively inserted over the boss 29A and 29B of the arch-like plate 29. The upper ends of the springs 21A and 21B are respectively hooked to the projections 29C and 29D formed on the arch-like plate 29. The lower ends of the springs 21A and 21B are respectively hooked to the projections 22B and 26B formed on the back surfaces of the arms 22 and 26. When a braking operation is applied to the arms 22 and 26, the rotational or swinging movements of the arms 22 and 26 cause the constriction of the springs 21A and 21B thereby enhancing the repulsing force of the springs 21A and 21B. Therefore, when the brake is released, the brake shoes 23 and 27 mounted on these arms 22 and 26 can be reliably forced to move in the direction departing from the rim due to the enhanced repulsing force.

In this embodiment, the spring 21A mounted on the arm 22 is arranged such that the repulsing force thereof is stronger than that of the spring 21B (the same type of the spring as used in the conventional center-pull type brake) mounted on the other arm 26.

On the other hand, a stopper 30 in this embodiment has a channel-like cross-section, and is integrally fixed to and projected from the arch-like plate 29 in such a manner that a portion of the inner circumferential edge of the arm 22 can impinge thereon as shown in FIG. 7.

Accordingly, as in the case of afore-mentioned embodiment, when the braking is applied to the braking apparatus, the arm 22 whose repulsing force is more strongly energized than the other arm 26 is rotated toward the rim 14 after the rotational movement of the arm 26, i.e. the brake shoes 27 and 23 approach in the mentioned order to the rim 14 to press the rim 14 therebetween.

When the brake is released, the brake shoe 23 is first set back from the rim 14 before the set-back movement of the brake shoe 27 is initiated.

During this brake-releasing movement of the arms, the arm 22 holding the brake shoe 23 engages the stopper 30 to be intercepted of its rotational movement, thereby causing the repulsing force so far applied to the arm 22 to work on the other arm 26. Therefore, in addition to the repulsing force from the spring 21B which has been originally applied to the arm 26, this repulsing force from the spring 21A is now worked on the arm 26 thereby assuring the set-back movement from the rim of the arm 26.

Figure 9:
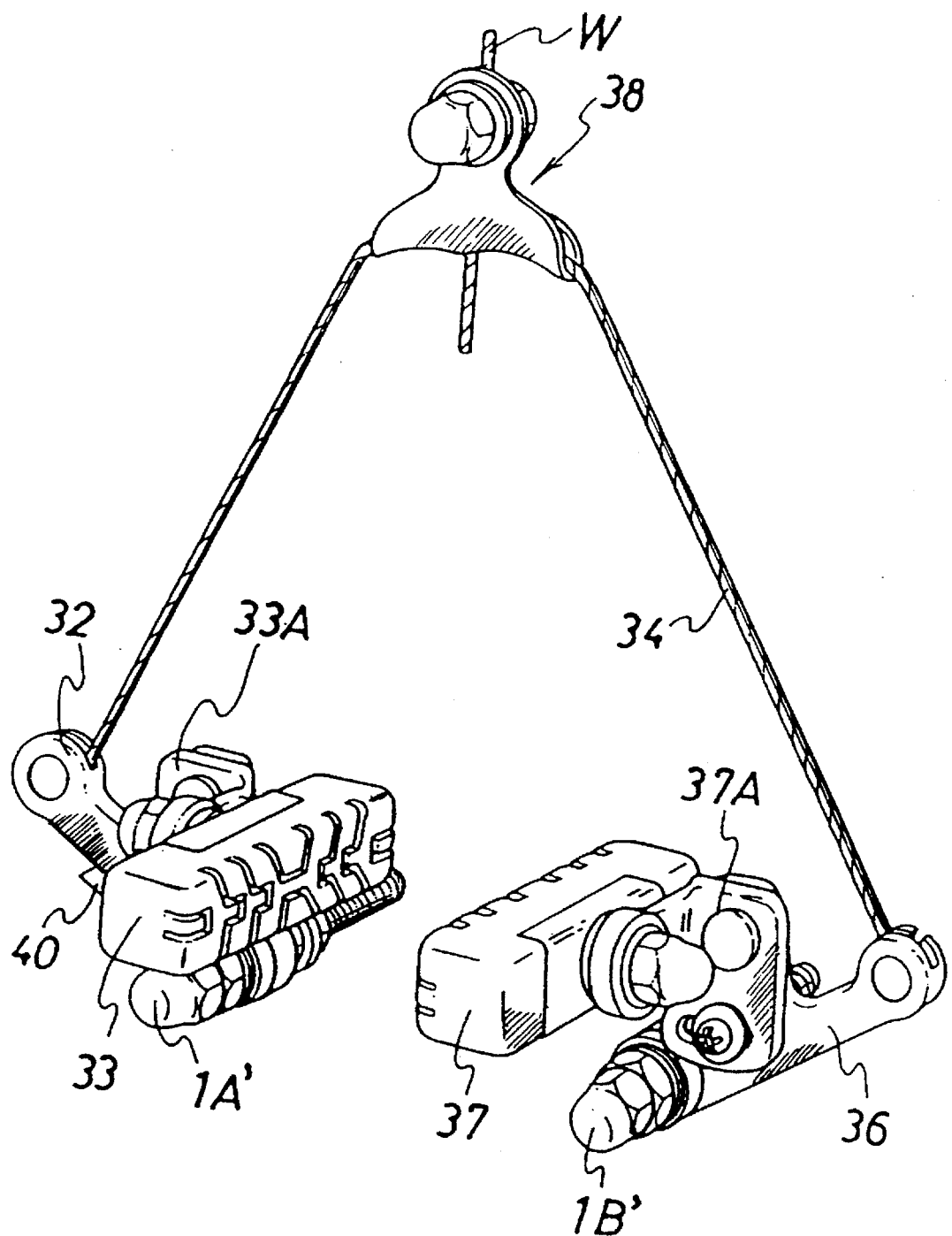
FIG. 9 is a perspective view of the braking apparatus which is applied to a cantilever center-pull type brake.
Figure 10:
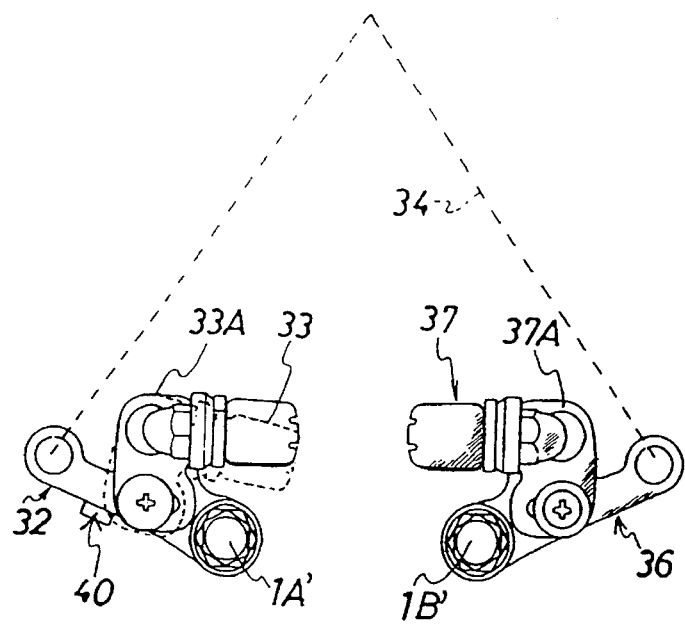
FIG. 10 is a front view of the braking apparatus shown in FIG. 9.
Figure 11:
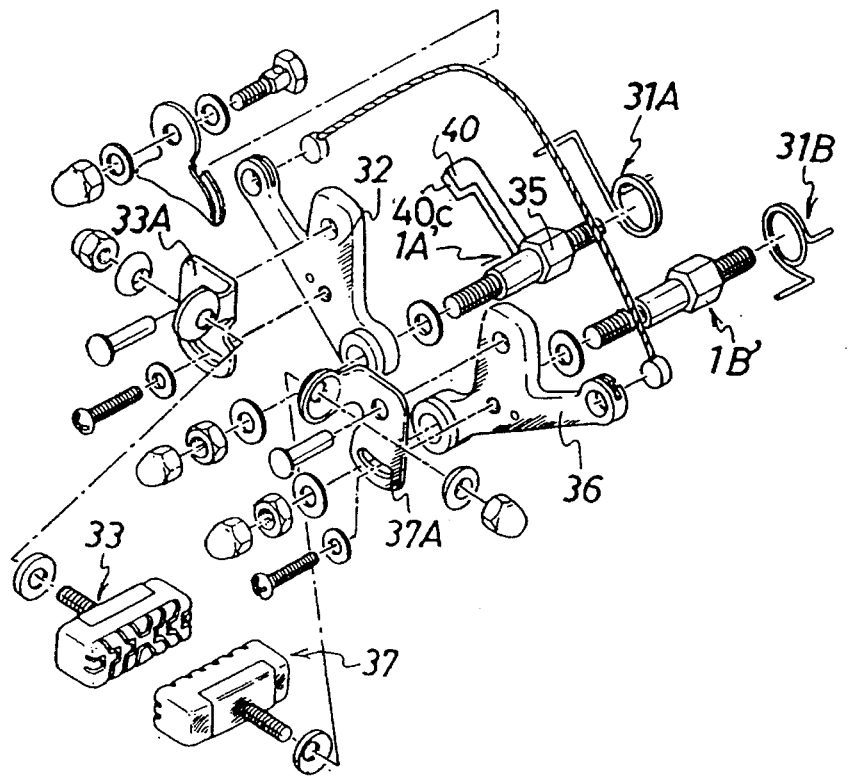
FIG. 11 is an perspective view of the braking apparatus shown in FIG. 9.

FIGS. 9 to 11 shows another embodiment of the braking apparatus according to this invention, wherein arms 32 and 36 are the same in shape i.e. a crank-like shape, and symmetrically arranged.

These arms 32 and 36 are pivotally secured together with L-shaped metal fittings 33A and 37A mounting thereon brake shoes 33 and 37 to the frame of a two-wheeler via cantilever central bolt 1A' and 1B'.

To the outer end portion of each of the crank-shaped arms 32 and 36 is connected a connecting member provided on each end of a pulling wire 34. The central portion of the pulling wire 34 is fitted with a triangular metal fitting 38, which is adapted to be pulled by a brake wire W connected to a brake lever.

In this embodiment, the springs 31A and 31B are mounted respectively to the arms 32 and 36. The spring 31A mounted on the arm 32 is arranged such that the repulsing force thereof is stronger than that of the spring 31B (the same type of the spring as used in the conventional cantilever center-pull type brake) mounted on the other arm 36.

The stopper 40 is disposed behind the crank-like arm 32 and fixed to the frame of a two-wheeler by being hooked on or integrally fixed to a nut-like protruded portion 35 formed at an intermediate portion of the central bolt 1A'.

This stopper 40 is provided at its tip portion with a rib 40c which is adapted to be impinged by the crank-like arm 32.

Accordingly, as in the case of afore-mentioned embodiment, when the braking is applied to the braking apparatus, the crank-like arm 32 whose repulsing force is more strongly energized than the other crank-like arm 36 is rotated toward the rim 14 after the rotational movement of the arm 36, i.e. the brake shoes 37 and 33 approach in the mentioned order to the rim 14 to press the rim 14 therebetween.

When the brake is released, the brake shoe 33 is first set back from the rim 14 before the set-back movement of the brake shoe 37 is initiated.

During this brake-releasing movement of the arms, the crank-like arm 32 holding the brake shoe 33 is impinged upon a rib 40c of the stopper 40 to be intercepted of its rotational movement, thereby causing the repulsing force so far applied to the arm 32 to work on the other arm 36. Therefore, in addition to the repulsing force from the spring 31B which has been originally applied to the arm 36, this repulsing force from the spring 31A is now worked on the arm 36 thereby assuring the set-back movement from the rim of the arm 36.

In the above embodiments, this invention has been explained with reference to braking apparatus which are peculiar to a two-wheeler such as bicycle. However, this invention is not confined to these braking apparatus, but is applicable to any other types of brake in which a pair of brake shoes are mounted in such a way that they can be set back to the original state by way of energized repulsing force.

Regarding the stopper, the shape thereof or the position in a two-wheeler to be fixed thereto is not restricted to above embodiments as far as the stopper is capable of intercepting the rotational movement toward brake-releasing direction of an arm mounting thereon a brake shoe.

This invention will be further explained with reference to a further embodiment wherein a main spring is mounted on a side-pull type caliper brake.

Figure 12:
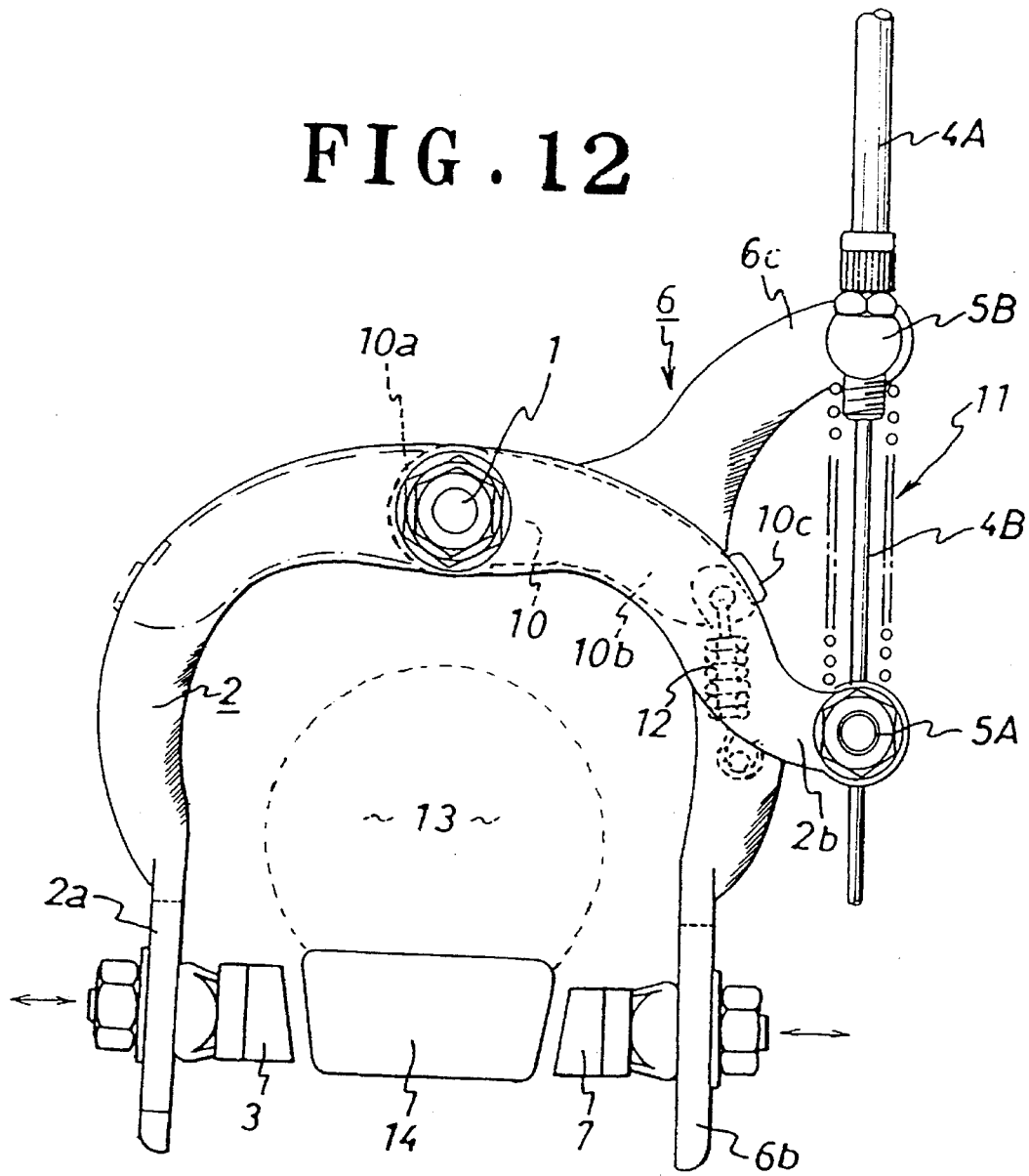
FIG. 12 is a front view of a side-pull type caliper brake provided with a main spring.

FIG. 12 shows a plan view of a side-pull type caliper brake for a bicycle, which comprises a central bolt (or a mounting bolt) 1 fixed to a body of a bicycle (not shown), a pair of left and right arms, i.e. C-shaped arm 2, and Y-shaped arm 6, a main spring 11 for imposing a restoring force on both of the arms 2 and 6, a supplementary spring 12 for energizing one of the arms 2 and 6 (in this embodiment, C-shaped arm 2) and a stopper 10 for intercepting the swinging (or rotational) movement of above-mentioned one of the arms 2 and 6 (in this embodiment, C-shaped arm 2) at a prescribed position.

The C-shaped arm 2 is in the form of approximately C in plan view, and the central portion of which is pivotally supported on the central bolt 1. A brake shoe 3 is mounted on one end portion 2a of the C-shaped arm 2, and a wire-fastening means 5 for connecting the arm 2 to an inner wire 4 extending within an outer wire 8 is provided on the other end portion 2b of the C-shaped arm 2.

The Y-shaped arm 6 is in the form of approximately Y in plan view, and the proximal end portion 6a of which is disposed inside the C-shaped arm 2 and pivotally supported on the central bolt 1. A brake shoe 7 is mounted on the lower extended end portion 6b of the Y-shaped arm 6, and a wire-fastening means 9 for connecting the arm 6 to the distal end portion of the outer wire 8 is provided on the other end portion of the upper extended end portion 6c of the Y-shaped arm 6.

The main spring 11 is formed of a coil spring which is inserted over the inner wire 4 and fitted between the wire-fastening means 5 of the C-shaped arm 2 and the wire-fastening means 9 of the Y-shaped arm 6. When the inner wire 4 is pulled in the braking operation of the brake lever (not shown), the extended end portion 6c of the Y-shaped arm 6 and the other end portion 2b of the C-shaped arm 2 is caused to approach toward each other thereby constricting the coil spring 11 and increasing the repulsing power of the coil spring 11, so that both of the extended end portion 6c of the Y-shaped arm 6 and the other end portion 2b of the C-shaped arm 2 are energized to set back from each other (the brake-releasing direction).

Figure 13:
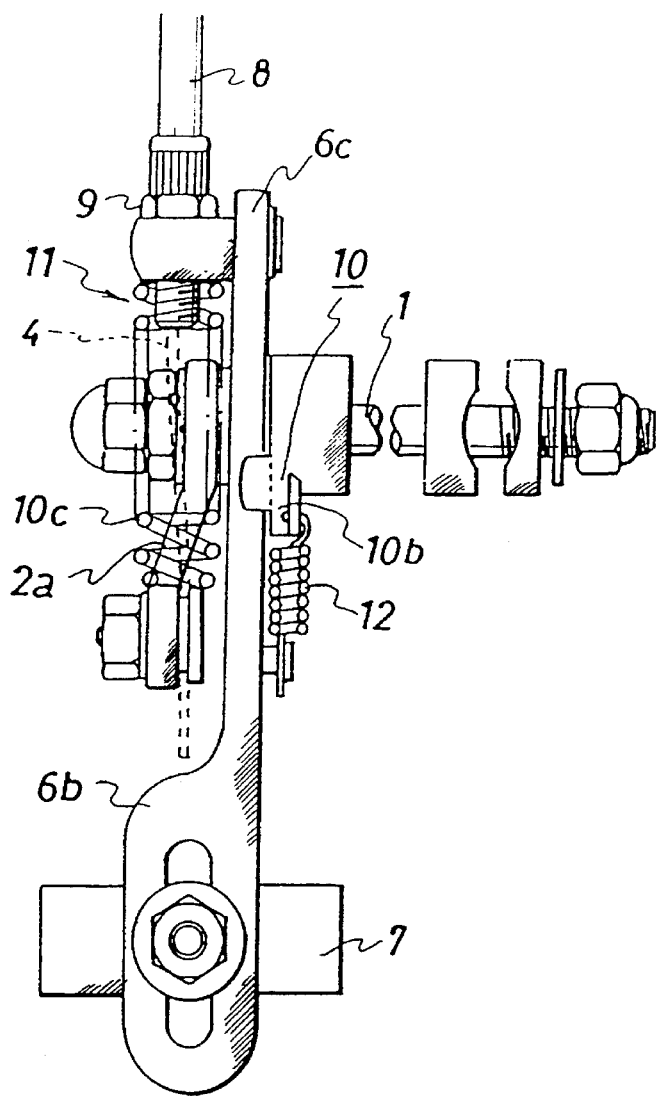
FIG. 13 is a side view of the braking apparatus shown in FIG. 12.

Meanwhile, the supplementary spring 12 is formed of a coil spring, one end of which is hooked at the rib 10a of the stopper 10, and the other end of which is hooked near the tip portion of the extended end 6b (mounting thereon a brake shoe) of the Y-shaped arm 6 as shown in FIG. 13.

Figure 14:
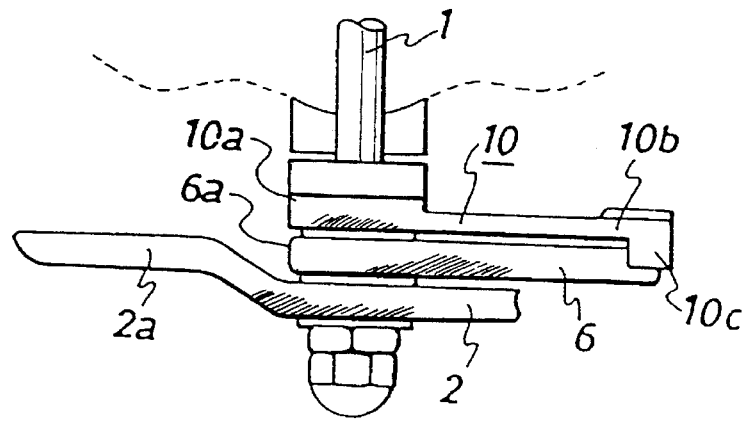
FIG. 14 is partial plan view of the braking apparatus shown in FIG. 12 as viewed from the top.

On the other hand, the stopper 10 is fixed through its distal end 10a to the central bolt 1, and disposed inside the Y-arm 6 as shown in FIG. 13 or FIG. 14.

In this embodiment, the proximal end portion of the stopper 10 is secured to a mounting member which is fixed to the central bolt 1 so as to set the stopper 10 in a predetermined position.

The distal end portion 10b of the stopper 10 extends along the inner surface of the extended end portion 6b of the Y-shaped arm 6, and is provided at its edge portion with a projection 10c, which is adapted to restrict the extent of rotational opening movement of the Y-shaped arm 6 by causing the upper edge portion of the extended end portion 6b to strike on the projection 10c.

The side-pull type brake as constructed above can be mounted on a two-wheeler as explained below.

First, the Y-shaped arm 6 is rotatably secured to the central bolt 1 in such a manner that the upper surface of the brake shoe 7 mounted on the extended end portion 6b of the Y-shaped arm 6 is set apart at a distance of, for example, about 2 mm from the side surface of the rim 14 of the wheel 13, thus fixing the Y-shaped arm 6 to the central bolt 1 and to the stopper 10.

Then, the upper surface of the brake shoe 3 mounted on one end portion 2a of the C-shaped arm 2 is also set apart at a distance of, for example, about 2 mm from the side surface of the rim 14 of the wheel 13, and the tip portion of the inner wire 4 is fastened by the wire-fastening means 5. Then, the Y-shaped arm 6 and C-shaped arm 2 are uniformly positioned to the rim 14 of the wheel 13.

When a braking is applied to the braking apparatus as constructed above, the inner wire 4 is pulled while constricting the main spring 11, thereby causing the end portion 2b of the C-shaped arm 2 to swing to approach the extended end portion 6c of the Y-shaped arm 6.

At this occasion, since the swinging movement of the extended end portion 6c of the Y-shaped arm 6 is restricted by the supplementary spring 12, the another end portion 2a of the C-shaped arm 2 and the brake shoe 3 mounted thereon is first swing to approach the rim 14.

Then, the extended end portion 6c of the Y-shaped arm 6 is caused to swing against the elasticity of the supplementary spring 12 toward the end portion 2b of the C-shaped arm 2, and at the same time the extended end portion 6b mounting thereon the brake shoe 7 is caused to rotate toward the rim of the wheel 13.

As a result, the both of left and right brake shoes 3 and 7 are sequentially impinged upon the rim 14 of the wheel 13 thereby pressing the rim 14 therebetween, thus stopping the wheel 13.

When the brake is released, since the Y-shaped arm 6 is more strongly energized by the repulsing force of the supplementary spring 12, the extended end portion 6b of the Y-shaped arm 6 is first set back from the rim 14 of the wheel 13, and then the outer edge portion of the extended end portion 6b is struck onto projection 10c of the stopper 10 thereby stopping the rotation of the Y-shaped arm 6.

As a result, the repulsing force acting on the Y-shaped arm 6 is then acted on the C-shaped arm 2 together with the repulsing force which has been originally acted on the C-shaped arm 2, thereby ensuring the detachment of the brake shoe 3 mounted on the end portion 2a of the C-shaped arm 2 from the rim 14 of the wheel 13 and causing the C-shaped arm 2 to return to the original position.

In this embodiment, the stopper 10 is shown to extend toward the extended end portion 6b of the Y-shaped arm 6. However, the stopper 10 may be extended toward the end portion 2a of the C-shaped arm as shown in a broken line in FIG. 12. In this case, the supplementary spring 12 is disposed between the one end 2a of the C-shaped arm 2 and the stopper 10.

Figure 15:
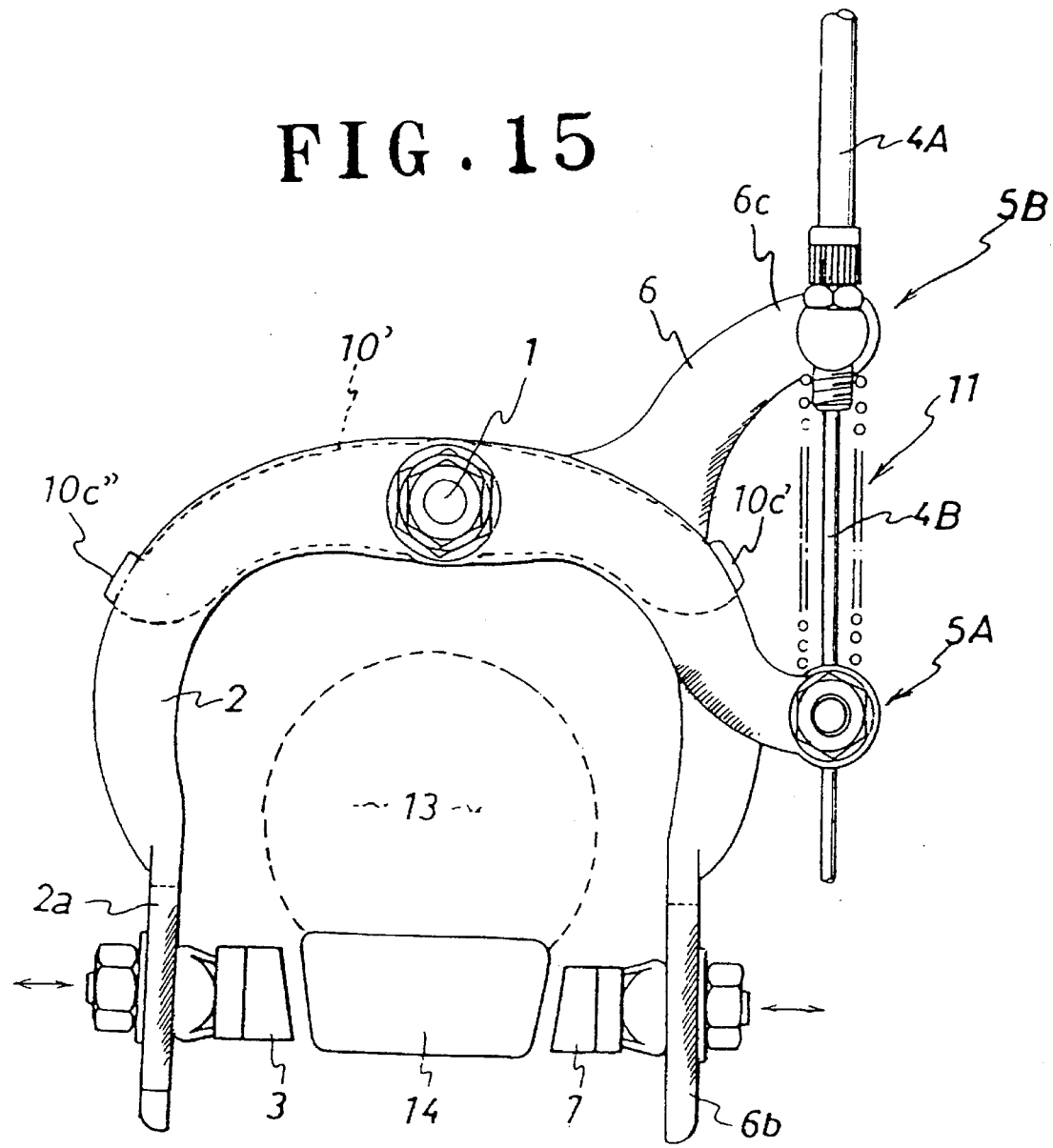
FIG. 15 is a front view of another embodiment.

It is also possible to dispense with the supplementary spring and to mount only the stopper 10' as shown in FIG. 15. Except to this modification, the embodiment shown in FIG. 15 has the same construction as shown in the above embodiment, and therefore the same parts depicted therein are represented by the same reference number as shown in the above embodiment.

It is also possible to construct the stopper 10' in such a manner that a pair of ribs 10c' and 10c'' are formed at left and right end portions thereof so that either of the arms 2 and 6 can be intercepted by these ribs 10c' and 10c''. In this case, if any one of the arms 2 and 6 sets back faster than the other, the repulsing force directing toward the original state of the arm which sets back later can be enlarged by the effect of the repulsing force of the arm which has set back first.

If either one of the arms 2 and 6 is liable to set back faster than the other for the convenience of mounting them, a stopper having only one rib at its end for intercepting the arm which is liable to set back faster than the other can be mounted.

It is also possible to set the left and right arms 2 and 6 so as to make equal the repulsing forces of them by inserting the main spring over the inner wire 4 between the wire-fastening means 5 of the C-shaped arm 2 and the wire-fastening means 9 of the Y-shaped arm 6. With this construction of the braking apparatus, it is possible to more effectively operate the braking or brake-releasing operation as compared with the conventional braking apparatus wherein both end of a spring are hooked at the intermediate portions of a pair of the arms.

As a spring for the main spring and supplementary spring, any kind of spring may be employed in addition to a coil spring.

In the above embodiments, the stopper is exemplified as one of the components of the braking apparatus. However, it is also possible to prepare the stopper separately and apply it to the conventional braking apparatus. In this case, the stopper is mounted on the braking apparatus, while adjusting the repulsing force of the spring, thereby realizing almost the same effects as those of the braking apparatus as exemplified in the afore-mentioned embodiments.

FIGS. 16 to 20 depict an embodiment wherein a stopper is applied to a cantilever center-pull type brake.

Figure 16:
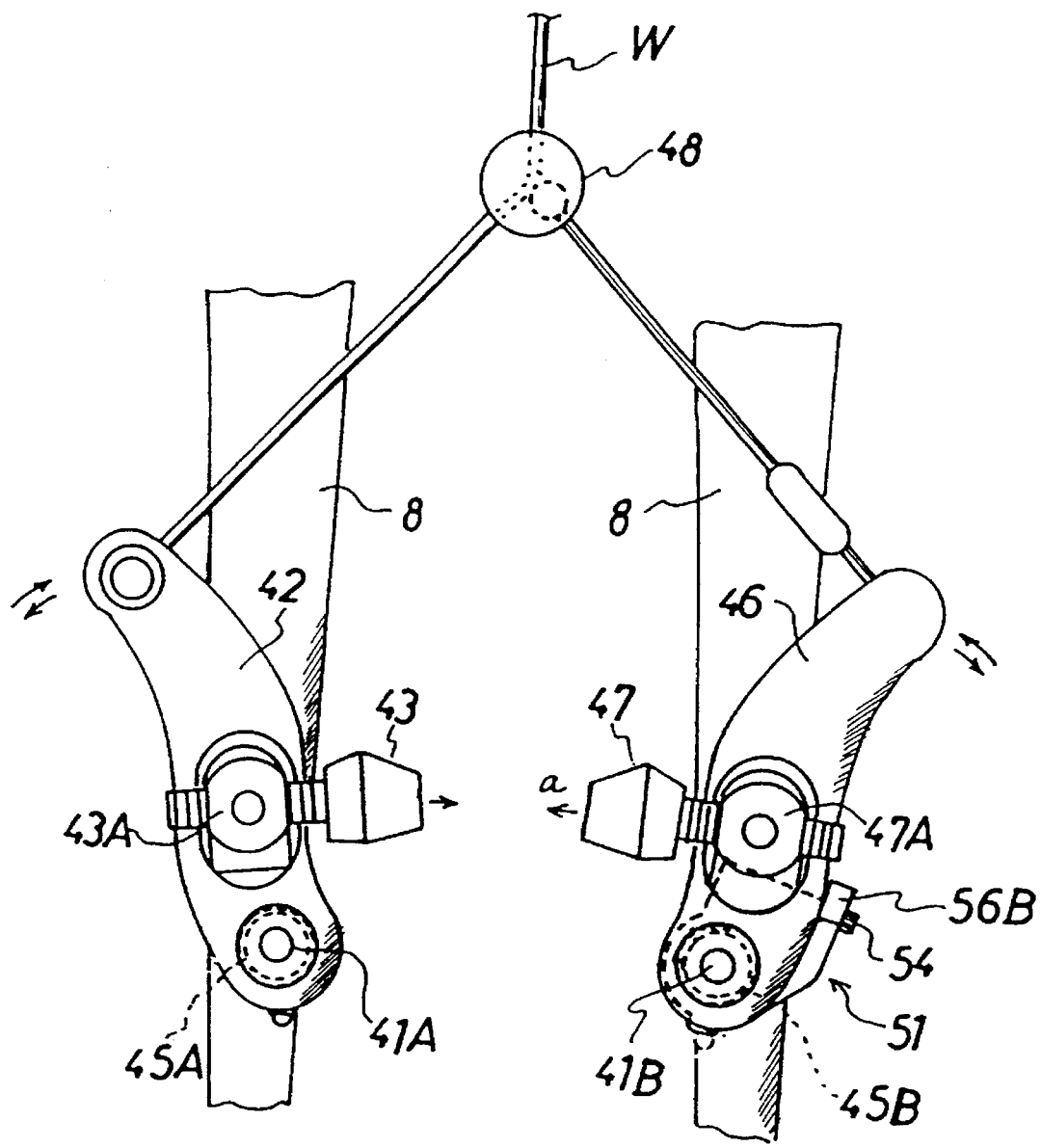
FIG. 16 is a front view of a cantilever center-pull type brake.

The braking apparatus shown in FIG. 16 comprises arms 42 and 46 having the same shape, i.e. a crank-like shape, and symmetrically arranged.

These arms 42 and 46 are pivotally secured together with fixing nuts 43A and 47A mounting thereon brake shoes 43 and 47 to the frame (fork portion) of a two-wheeler via cantilever central bolt 41A and 41B.

To each of the crank-shaped arms 42 and 46 is connected a wire W. The central portion of the pulling wire W is fitted with a cable carrier 48 which is adapted to be operated by a lever.

In this embodiment, the central bolts 41A and 41B are fixed to the fork portion 80 in integral with the boss-like base 90. To each tip portion of the bolts 41A and 41B is screwed a cap nut with which arms 42 and 46 are pivotally secured.

In this embodiment, the springs 45A and 45B are mounted respectively to the arms 42 and 46. The spring 45B mounted on the arm 46 is arranged such that the recovering force (repulsing force) thereof is stronger than that of the spring 45A mounted on the other arm 46.

In this embodiment, since the braking apparatus is provided as that of the conventional braking apparatus with a means (means) for adjusting the repulsing force by displaycing the connecting position of the springs 45A and 45B thereby increasing or decreasing the winding number of the spring, it is possible to increase the repulsing force of for example the spring 45B mounted on the arm 46 as compared with that of the other spring 45A.

If a braking apparatus is not provided with such an adjusting means for the springs 45A and 45B, a pair of springs having a different repulsing force from each other may be preliminarily prepared and mounted to the arms.

To this braking apparatus mounting thereon a pair of springs in this way is attached with a stopper 51 according to this invention.

Figure 18:
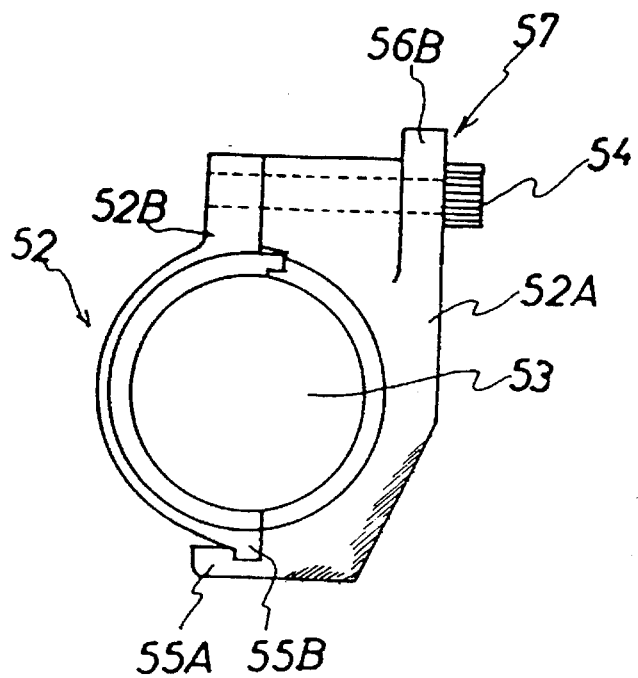
FIG. 18 is a bottom view of a stopper for a cantilever center-pull type brake.

This stopper 51 comprises as shown in FIG. 18 a mounting portion 52 and a stopper portion 57. The mounting portion 52 is in a form of ring having an opening 53 for inserting therein a base 90 attached to the fork 80 of a bicycle. More specifically, the mounting portion 52 comprises divided components 52A and 52B, and is provided at its distal end with an adjustment screw 54 for tightening these divided components 52A and 52B together.

In the case of the embodiment shown in FIG. 18, a pair of concave portion 55A and convex portion 55B are respectively formed at the proximal end portions of the pair of divided components 52A and 52B thereby restricting the movements of the divided components 52A and 52B in the lateral direction and allowing only the vertical movements thereof. By tightening the adjustment screw 54 mounted on the tip portion of the mounting portion 52, the diameter of the opening 53 can be shortened.

To the divided component 52A, which is positioned at the side to be attached with the adjustment screw 54, is integrally connected a connecting member 56A extending outward and a stopper portion 57 having a rib 56B protruding forward.

A step portion is formed in the opening 53 so as to form a space between the stepped portion and the fringe 9A formed at the distal end portion of the base 9.

Figure 17:
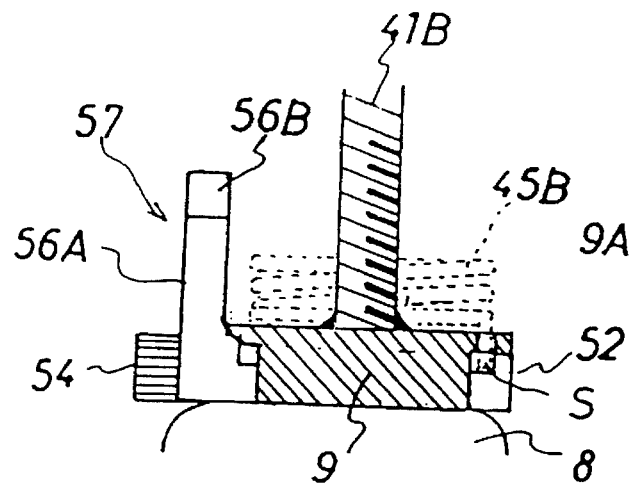
FIG. 17 is a cross-sectional view of, in a cantilever center-pull type brake, a main portion of the brake shown in FIG. 16.

A hole is formed on the fringe 9A for fitting therein the end portion of the spring 45B, and the tip end of the spring 45B can be allowed to go into the space as shown in FIG. 17.

When attaching the stopper 51 to a bicycle, the adjustment screw 54 is first loosened, the opening 53 of the mounting portion 52 is fitted in the base 9, the stopper portion 57 is disposed along the outside of the base 9, and the adjustment screw 54 is tightened, thereby mounting the stopper 51 to the fork 80, the mounting portion 52 being fixed to the base 90.

In this case, the rib 56B of the stopper portion 57 is set in position such that the rib 56B is collided with the lower outer edge of the arm 46, which is being energized more strongly than the other arm.

In other words, the rib 56B is positioned at an intermediate portion of a locus to be traced by the arm 46 during the brake-releasing operation, thereby restricting the rotational (swinging) movement through the spring 45B of the arm 46.

The stopper 51 is generally attached to an arm which is more strongly energized. However, it is also possible to mount the stopper 51 to both of the arms, one of the springs being energized stronger than the other.

In this case, sectional configuration of the base 90 may be formed into a shape having a corner, such as a square in cross-section. At the same time, the opening 53 of the mounting portion 52 may be aligned with the cross-sectional configuration of the base 90 so that the mounting portion 52 is prohibited by the base 90 of its rotational movement along the circumference thereof. In this manner, it is possible to restrict the rotational movement- toward the brake-releasing direction after the stopper portion 57 is impinged upon the arm 42.

Figure 19:
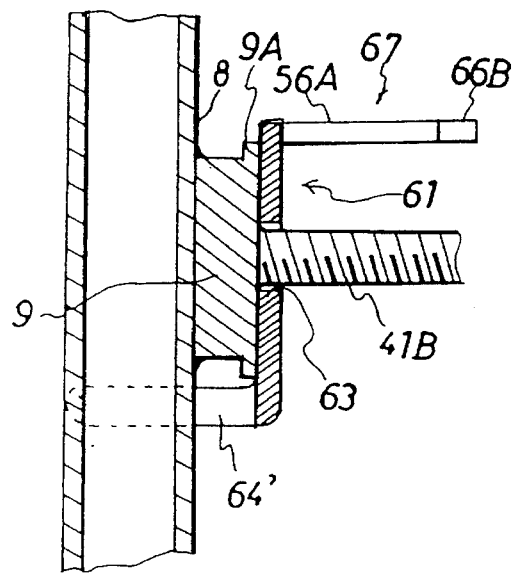
FIG. 19 is a cross-sectional view of a main portion of a stopper according to another embodiment of this invention, which is for a cantilever, center-pull type brake, provided with a straining portion.

It is also possible to form a braking apparatus wherein the stopper 61 is mounted on the base 90, and an intercepting portion 64' to be contacted with the fork is extended together with the stopper portion 67 as shown in FIG. 19.

In this case, when the arm is contacted with the stopper portion 67, the intercepting portion 64' is impinged onto the fork portion 80, thereby intercepting the rotational movement of the stopper 61, thus making it possible to restrain the movement of the arm 16 by means of the rib 66B.

Figure 20:
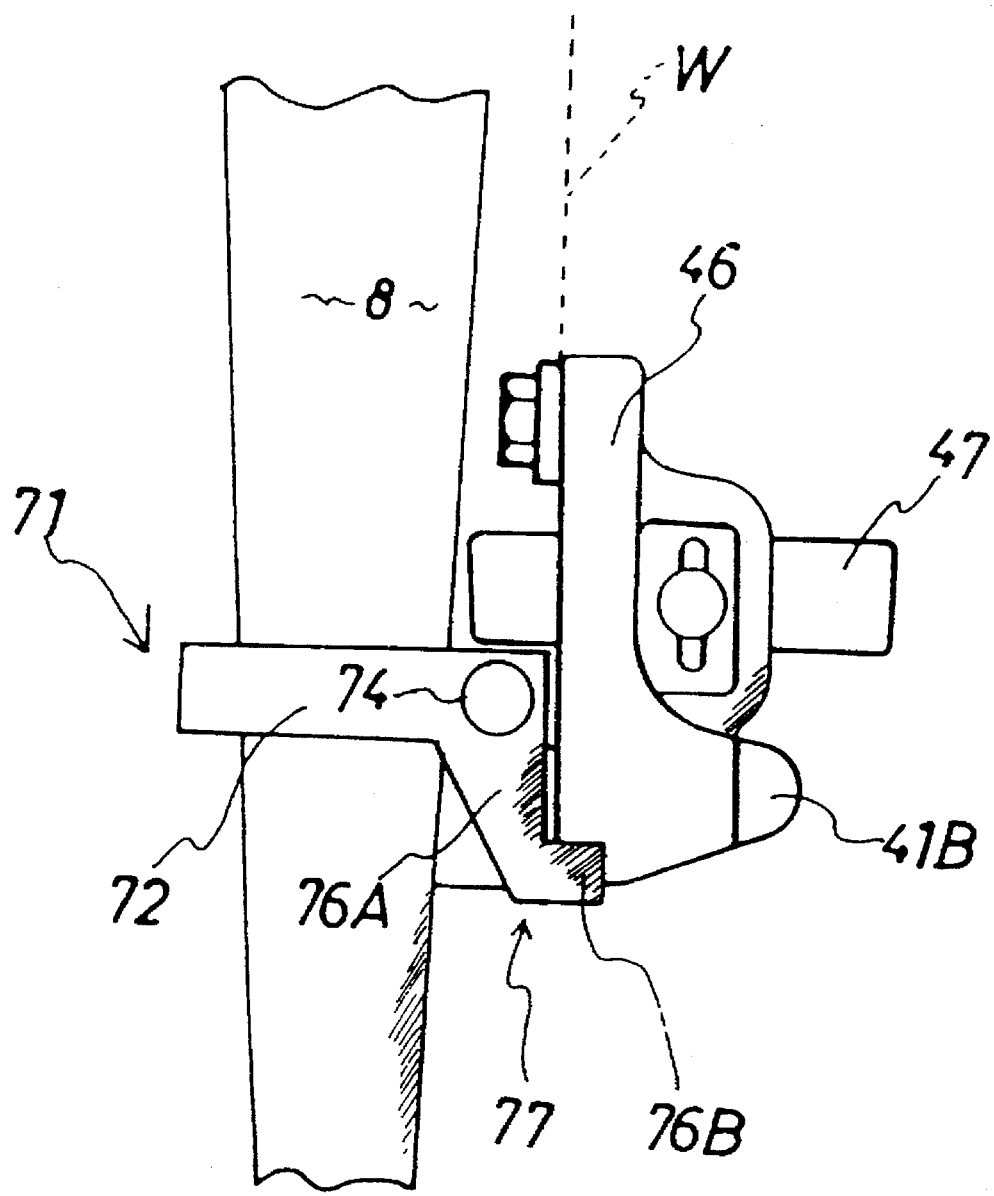
FIG. 20 is a side view of a stopper having a stopper portion extending downward according to still another embodiment of this invention in a cantilever, center-pull type brake.

The mounting portion 72 of the stopper 71 may be attached to the fork 8 by being fitted therein as shown in FIG. 20.

In this case, the connecting portion 76A is extended downward forming the rib 76B.

In any case, any engaging means or stopper means may be applicable to this invention as far as the stopper 51,61 and 71 is mounted in such a manner that the movement of the arm can be suitably restricted.

The stopper may be fixed directly by means of a screw and the like to a fork portion or frame body of a bicycle.

Although the above embodiment is directed to a cantilever type center-pull brake, the like stopper which is prepared separately can be applicable to a center-pull type brake, or side-pull type brake.

Figure 21:
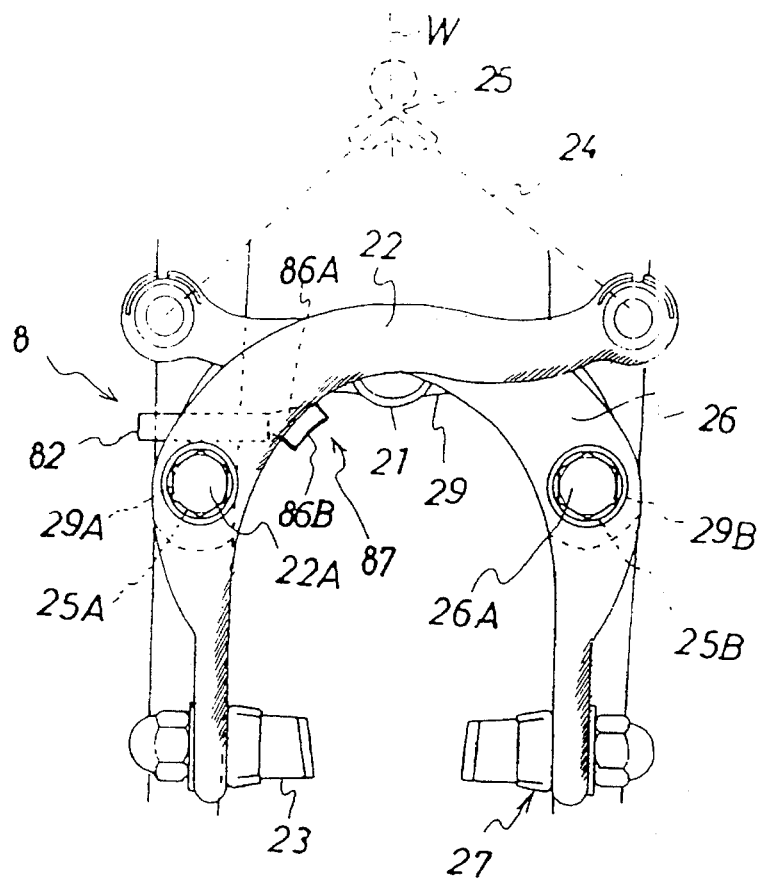
FIG. 21 is a front view of a center-pull type bake.

For example, in the case of center-pull type brake shown in FIG. 21, it comprises an arch-like plate 29 fixed by means of a central bolt 21 to the frame of a two wheeler, and a pair of arms 22 and 26, each having a shape of approximately C. These arms 22 and 26 are symmetrically superposed and disposed in front of the arch-like plate 29. The intermediate portion of each of the arms 22 and 26 is fixed to the boss 29A and 29B provided at each end portion of the arch-like plate 29 by means of arm-fixing bolts 22A and 26A. The upper extended end portion of each of the arms 22 and 26 is connected with a fitting member attached to the end portion of the pulling wire 24, the central portion of which being fastened to a triangular metal fittings 25. The metal fitting 25 is adapted to be pulled by a brake wire W connected to an operating lever.

In this case, the springs 25A and 25B are respectively inserted over the boss 29A and 29B of the arch-like plate 29, and hooked between the projected portions on the arch-like plate 29 and the projected portions formed on the back surfaces of the 22 and 26.

In this embodiment, the spring 25A mounted on the arm 22 is arranged such that the repulsing force thereof is stronger than that of the spring 25B (the same type of the spring as used in the conventional center-pull type brake) mounted on the other arm 26.

In this case, the mounting portion 82 of a stopper 87 is secured to the fork portion 80 (or boss 29A of the arch-like plate 29 to be fixed to the frame), or attached to the fork portion 80 in a manner to be restricted of its movement toward the braking direction, so as to dispose the rib 86B of the stopping portion 87 respectively in a position to be contacted with the lower edge portion of one of the arms which has been more strongly energized by the spring.

The connecting mechanism of the mounting portion 82 is the same as that of the previous embodiment, and the rib 86B is also formed into a shape to be contacted with the circumferential edge portion of the arm 22 so as to restrain the movement of the arm 22 in the brake-releasing direction. The connecting portion 86A of the stopping portion 87, respectively integrally connect the rib 86B to the mounting portion 82.

Accordingly, as in the case of previous embodiments, when the arm 22 which is more strongly energized by a spring is set back from the braking position, the arm 22 is impinged onto the rib 86B during its movement to set back to be stopped of its movement.

Figure 22:
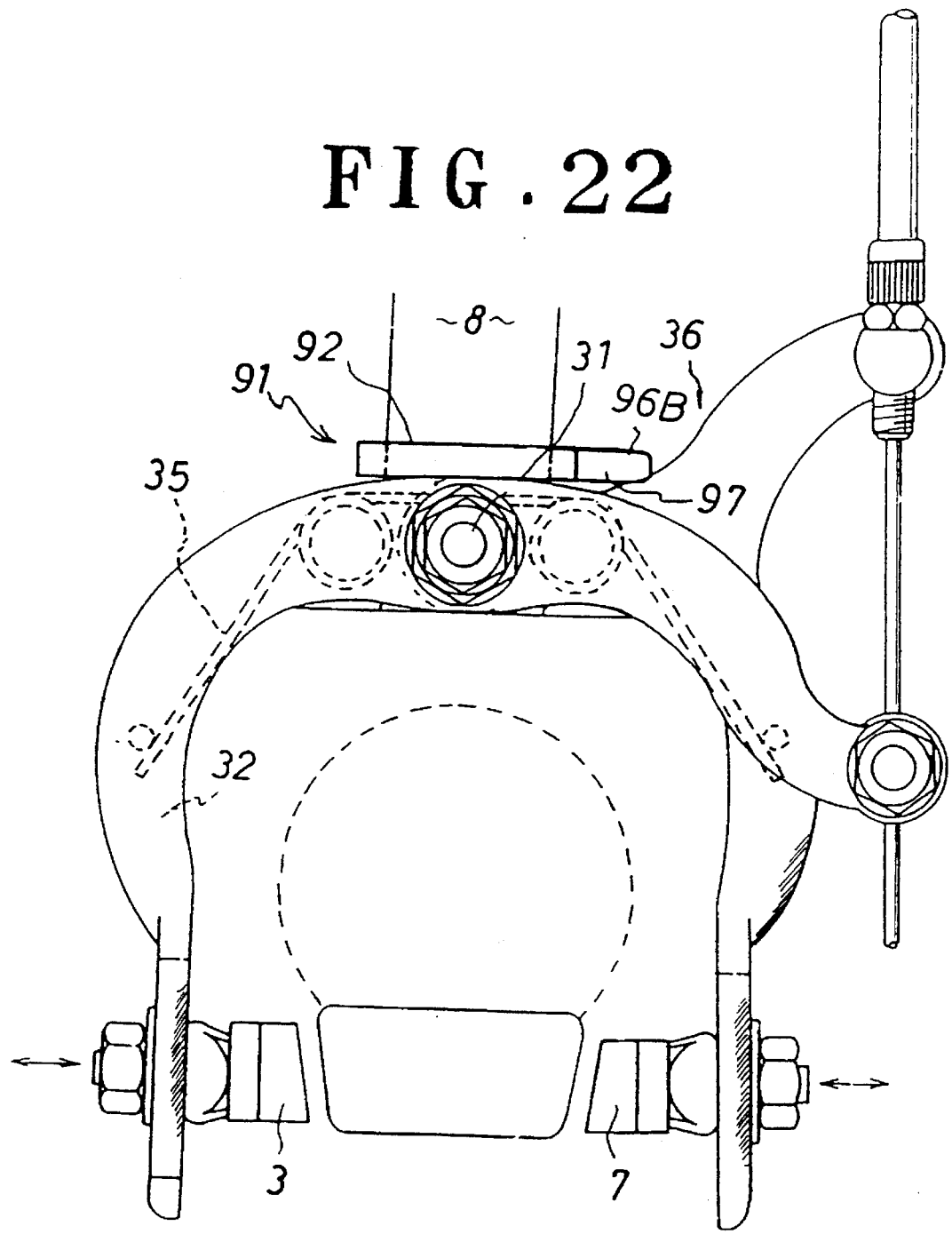
FIG. 22 is a front view of a side-pull type brake.

In the case of side-pull type brake, it comprises as shown in FIG. 22 a central bolt (mounting bolt) 31, a pair of left and right arms, i.e. C-shaped arm 32 and Y-shaped arm 36 pivotally attached to the central bolt 31, and a spring 35 for energizing the arms 32 and 36.

The spring 35 is set, for example by increasing the degree of inclination thereof, so as to make stronger the repulsing force of acting arm portion to be engaged with one of the arms (in this case, C-shaped arm 32) than the acting arm portion to be engaged with the other one of the arms (in this case, Y-shaped arm 36).

In this case, the mounting portion 92 is secured to the fork portion 80, or attached to the fork portion 80 in a manner to be restrained of its movement toward the braking direction, so as to dispose the rib 96B of the stopping portion 97 in a position to be contacted with the upper edge portion of the arm 36 which has been more strongly energized by the spring.

In this case, the rib 96B is set so as to impinge onto the upper edge of the Y-shaped arm 36 to restrain the movement toward the brake-releasing direction of the Y-shaped arm 36.

Accordingly, as in the case of previous embodiments, when the Y-shaped arm 36 which is more strongly energized by a spring is set back from the braking position, the Y-shaped arm 36 is impinged onto the rib 96B during its movement to set back to be stopped of its movement.

In the above embodiments, this invention is explained on the braking apparatus as applied to a bicycle. However, this invention is also applicable to a wheelchair, or other kinds of two wheeler.

As explained above, it is possible according to the present invention to reliably set back the both of the brake shoes at the time of releasing brake from the rim, as one of the arms bearing thereon shoes is more strongly energized toward set-back direction, and at the same time a stopper for restraining the rotational movement of the abovementioned one of the arms is attached to the braking apparatus thereby giving rise to the increase of the repulsing force of the other arm.

The braking apparatus of this invention is simple in structure, and can be easily attached to the two-wheeler without requiring any troublesome adjustment operation, thus highly improving the efficiency of the mounting operation.

Although the left and right brake shoes will work on the rim of the wheel with slight difference in time, it has been recognized that it will not substantially affect the braking effects, so that a reliable and stable braking can be realized.

When a main spring which generates a repulsing force through the constriction thereof is disposed between the extended end portion of the one of the arms connected to an outer wire and the extended end portion of the other one of the arms connected to an inner wire extending out of the outer wire, the same degree of repulsing force can be applied to both of the arms, so that there is no possibility that the repulsing force to be applied to one of the arms is weaker than that to be applied to the other one of the arms.

In this case, by disposing a supplementary spring in the braking apparatus, it become possible to increase the repulsing force of one of the arms as compared with the other one of the arms, thereby allowing the above-mentioned one of the arms to approach later than the other one of the arms, and to set back faster from the rim than the other one of the arms does.

What is claimed is:

1. A mechanism of a brake for a two-wheeler comprising a pair of left and right arms pivotally attached to a frame of the two-wheeler, each having on its distal end portion a brake shoe, and a spring for energizing each of said arms to move said respective arm in a brake releasing direction from an actuated state, wherein one of said arms is more strongly energized by said respective spring than the other of said arms, a stopper being provided to restrict the extent of the movement of said one of said arms towards said brake releasing direction so that, when one of said arms is set back to said brake releasing direction, said one of said arms is stopped by said stopper from further movement thereof before the setting-back movement of said other of said arms is completed, thereby allowing said other arm to be set back to the original position, wherein both of said arms are of the same C-shaped structure, an intermediate portion thereof being pivotally attached to a frame of said two-wheeler by means of a center bolt, each proximal end portion of the C-shaped arms being connected to one end portion of a pulling wire, said pulling wire having a middle portion connected to a central brake wire thereby forming a center-pull type brake.

2. A braking device according to claim 1, wherein said stopper is formed as an integral part with a member fixed to said center bolt.

3. A braking device according to claim 2, wherein said stopper is attached to a portion of said member, said member being an arch-like plate which is fixed to said center bolt in such a manner that the movements of one of said arms toward the brake releasing direction can be restricted.

4. A braking device according to claim 2, wherein each of said springs is of a coil-like structure, one end of which being hooked to the arm and the other end of which being hooked to a base member to which the arm is fixed, and one of the springs hooked to one of the arms is set so as to have a stronger restoring force as compared with the other spring hooked to the other one of the arms.

5. A braking device according to claim 1, wherein said stopper is attached to a portion of an arch-like plate which is fixed to said center bolt in such a manner that the movements of one of said arms toward the brake releasing direction can be restricted.

6. A braking device according to claim 1, wherein each of said springs is of a coil-like structure, one end of which being hooked to the arm, and the other end of which being hooked to a base member to which the arm is fixed, and one of the springs hooked to one of the arms is set so as to have a stronger restoring force as compared with the other spring hooked to the other one of the arms.

* * * * *